United States Patent
Ward et al.

(10) Patent No.: US 6,171,500 B1
(45) Date of Patent: Jan. 9, 2001

(54) BIOLOGICAL PROCESS FOR BREAKING OIL-WATER EMULSIONS

(75) Inventors: Owen P. Ward; Ajay Singh, both of Waterloo (CA)

(73) Assignee: Petrozyme Technologies Inc., Guelph (CA)

( * ) Notice: Under 35 U.S.C. 154(b), the term of this patent shall be extended for 0 days.

(21) Appl. No.: 09/294,493

(22) Filed: Apr. 20, 1999

(30) Foreign Application Priority Data

Apr. 22, 1998 (CA) .................................................. 2235528

(51) Int. Cl.⁷ ....................................................... C02F 3/00
(52) U.S. Cl. ........................... 210/610; 210/800; 435/281
(58) Field of Search .................................. 210/610, 800, 210/708; 435/281; 516/145, 170

(56) References Cited

U.S. PATENT DOCUMENTS

| | | | |
|---|---|---|---|
| 1,753,641 | * | 4/1930 | Beckman . |
| 3,856,667 | * | 12/1974 | Azarowicz . |
| 4,349,633 | * | 9/1982 | Worne et al. . |
| 4,392,892 | | 7/1983 | Wagner et al. ...................... 134/25.1 |
| 4,432,887 | * | 2/1984 | Zajic et al. . |
| 5,358,760 | * | 10/1994 | Monticello et al. . |
| 5,411,665 | * | 5/1995 | Scraggs et al. . |
| 5,551,987 | | 9/1996 | D'Addario et al. ................... 134/10 |
| 5,989,892 | * | 11/1999 | Nishimaki et al. . |

OTHER PUBLICATIONS

F.S. Manning, et al., "Oilfield Processing Volume Two: Crude Oil", PennWell Publishing Co., Oklahoma, 1995, pp. 41, 42 and 44.

Petroleum Extension Service, "Treating Oilfield Emulsions", Fourth Edition, The University of Texas at Austin, 1990, pp. 8 and 9.

Kirk–Othmer Encyclopedia of Chemical Technology, Fourth Edition, Volume Nine, "Elastomers, Polyisoprene to Expert Systems", Wiley–Interscience Publication, John Wiley & Sons, New York, 1991, p. 409.

* cited by examiner

Primary Examiner—David A. Simmons
Assistant Examiner—Fred Prince
(74) Attorney, Agent, or Firm—Libert & Associates

(57) ABSTRACT

A process for breaking an oil-water emulsion. The process comprises contacting the oil-water emulsion with a bacterial culture produced by growth in a liquid medium containing hydrocarbons under non-sterile conditions. The oil-water emulsion and bacterial culture are contacted under conditions that minimise degradation of the oil. The oil-water emulsion is permitted to form an oil layer and a water layer, which are then separated. The process is particularly useful in the treatment of slop-oil emulsion in the petroleum industry.

13 Claims, No Drawings

BIOLOGICAL PROCESS FOR BREAKING OIL-WATER EMULSIONS

The present invention is directed to a process for the breaking of an oil-water emulsion, by contacting the emulsion with a bacterial culture grown from hydrocarbons under non-sterile conditions, permitting oil and water layers to separate and then separating each of the layers. The oil-water emulsion may be an oil-in-water emulsion or a water-in-oil emulsion.

An emulsion is usually a mixture of minute globules of one liquid dispersed in a second non-miscible liquid. In the case of oil-water emulsions, the emulsion may be in the form of oil globules in a continuous water phase (oil-in-water) or, conversely, water globules in a continuous oil phase (water-in-oil). Two immiscible liquids will tend to form an emulsion as result of some type of physical or mechanical agitation of the two liquids if an emulsifying agent, which promotes emulsion formation, is present. Emulsifying agents found in water-petroleum oil emulsions include the asphaltene and resin components of the oil, oil-soluble organic acids or other chemicals originally present in the oil or which have been added to it.

In oil exploration and production, there is substantial need for processes to break crude oil:water emulsions with maximum oil recovery. As oil comes from the oil well, some water i.e. so-called produced water, from the formation is also recovered and the combined mixture of oil and water is pumped into a field tank. The oil and water phases tend to separate, with the oil phase rising to the top and the water phase being at the bottom. An oil and water emulsion usually forms at the interface between the phases.

Many such oil-water emulsions contain solids material. The solids may act as a mechanical barrier, and prevent coalescence of emulsion droplets. In the case of petroleum oil-water emulsions, the solids may consist of fine particles also known as clay fines.

The emulsion cannot be transferred to the pipeline. Typically, pipeline quality oil should contain less that one percent water and solids. Therefore, the emulsions are usually brought to a treater facility which aims to separate the emulsion into pipeline quality oil, which can be sold, and water and solids. Treater facilities aim to neutralize the properties of emulsifying agents or destroy them, thereby breaking the emulsion.

A combination of physical and chemical treatments may be used to break the emulsions e.g. centrifugation, heat, electrical treatment or use of chemicals. Chemicals used in the breaking of emulsions include soap, fatty acids and long chain alcohols. Chemical emulsion breakers when, for example added to a water-in-oil emulsion, make the droplets of water merge or coalesce. Larger droplets of water tend to settle out of oil faster than smaller droplets.

The emulsion may also be broken electrically or mechanically. Heat decreases emulsion viscosity, and increases the momentum of water and oil molecules increase in the mobility of the emulsion droplets causes the droplets to collide with each other more frequently which promotes rupturing of the emulsion, coalescence of the droplets and separation of the water and oil phases. The molecules of surfactant materials at the interfaces in an emulsion are arranged with polar ends facing the water phase and non-polar ends facing the oil phase. Electrical currents can cause these molecules to rearrange, thereby disrupting the emulsion.

Emulsion treaters used in commercial processing of crude oils are typically heat treaters or electrostatic treaters. However, even in these treaters a difficult-to-break emulsion layer, often referred to as slop oil emulsion, develops and accumulates in the treater and reduces treater capacity. One of the problems associated with use of heat and chemical-based methods to break emulsions is that the resulting slop oil emulsion tends to be more stable and more difficult to break. The stabilizing agent of slop oil emulsions is often a surface active material dissolved in one of the phases. Thus, degrading or modifying the stabilizing agent represents a key objective in attempting to break these emulsions. The volumes of slop oil emulsions may amount to one percent of oil produced.

Residual emulsion material, slop oil emulsions, is a waste material which either requires disposal or is accumulated on site. In some countries, emulsions which survive chemical, thermal or other treatment in the treater are dumped in oil pits or tanks or are transported in tankers to lagoons. Alternatively, these emulsions are disposed of by pumping into salt caverns or are sent to landfills.

Slop oil emulsions vary in their properties depending on the properties and viscosity of the oil, the geologic formation where the oil originated, the amount of water and solids, the salt content of the water, the nature of the solids material, and the chemical or physical treater process.

Bacteria have a variety of properties which give them potential for use in oil-water emulsion breaking processes. Bacteria can act in a number of ways to modify the forces stabilizing an emulsion. For instance, bacterial cells or their products may exhibit surfactant activity, may biotransform surface active agents into agents which have less surfactant activity, may degrade or transform oil components which are involved in emulsion formation or may modify the pH at the emulsion interface. These or other biological mechanisms may contribute to breaking an emulsion.

It is known to use single, pure bacterial cultures in the treatment of emulsions. For instance, (a) *Mycobacterium cuneatum, Mycobacterium petroleophilum* and some Psuedomonads cause coalescence of kerosene in water emulsions containing a surfactant; (b) *Nocardia amarae*, grown in a medium contained hexadecane, can de-emulsify oil-in-water emulsions that were prepared by mixing kerosene or various pure alkanes with a water-containing a surfactant; (c) acetoin, produced by *Bacillus subtilis*, promotes de-emulsification of a 1% oil in water emulsion containing Tween-80™ surfactant, and (d) pure cultures of *Nocardia amarae, Corynebacterium petrophilium* and *Torulopsis bombicola* de-emulsify oil-in-water and water-in-oil petroleum field emulsions. However, use of single pure bacterial cultures is a disadvantage from a commercial perspective, since preparation of the cultures requires use of sterilized fermenter and culture media which have high associated capital and operating costs.

U.S. Pat. No. 4,392,892 describes a process for separating hydrocarbons from particulate solids using a crude extract of microbially-produced glycolipids. U.S. Pat. No. 5,551,987 describes a process for treating of solid waste or mud contaminated with hydrocarbons which involves extracting the material with non-volatile organic solvent and contacting the oily extract with microbes which produce biosurfactants.

PCT/CA98/00108 filed Mar. 20, 1998 describes a mixed biological process for degradation of oil sludges, including refinery sludges, tank-bottoms, slop oil or treater emulsions and others. The method involves forming an oil-in-water emulsion in a reactor such that the reactor contains up to 50% by volume of hydrocarbons and where the hydrocarbon content in the reactor is reduced by at least 25%.

An improved process for the breaking of oil-water emulsions that may be operated In the field would be useful.

A biological process for the breaking or oil-water emulsions that may be used in the field has now been found.

Accordingly, one aspect of the present invention provides a process for breaking an oil-water emulsion comprising:

a) contacting the oil-water emulsion with a bacterial culture produced by growth in a liquid medium containing hydrocarbons under non-sterile conditions, said oil-water emulsion and bacterial culture being contacted under conditions that minimise degradation of said oil;

b) permitting the oil-water emulsion to form an oil layer and a water layer; and c) separating each of the oil layer and the water layer so formed.

In a preferred embodiment of the process of the invention, solids are present in the emulsion and such solids are permitted to settle to the bottom of the water phase during step (b).

In a further embodiment, the culture consists of a mixed culture previously grown on a petroleum or other oil-containing substrate, especially such a culture having a starting cell count in the emulsion treatment system of $5 \times 10^6 - 5 \times 10^9$ Cfu/ml and preferably greater than $5 \times 10^7$ Cfu/ml.

In a still further embodiment, a light petroleum, or vegetable oil or other chemical or nutrient supplement or supplements may be added to the emulsion, with the bacterial culture, to promote breaking of the emulsion.

In another embodiment, the culture may consist of more than one pure culture or a combination of one or more pure cultures with a mixed culture.

In a still further embodiment, molecules produced by the culture, or fractions of cells which break or contribute to de-emulsification, may be added alone, or in combination with a culture, and/or oil or chemical supplement.

The present invention utilizes a microbial culture capable of oil sludge biodegradation for the purpose of breaking pre-existing oil-water emulsions with minimal degradation of the associated hydrocarbon. The starting material for the process is either an oil-in-water or water-in-oil emulsion, where solids may or may not be also present at the oil-water interface. The process is operated to minimise substantial degradation of hydrocarbons i.e. to break the emulsion with minimal degradation of oil. Thus, hydrocarbon degradation is preferably 0–25% or more preferably 0–10% of the hydrocarbon in the emulsion. The process uses an oil degrading culture which can be prepared as described below.

In the biological process that has now been found, the oil-water emulsion breaks with efficient separation of the emulsion into a top (upper) oil layer and bottom (lower) aqueous layer. Solids associated with the emulsion tend to settle at the bottom of the aqueous layer.

The method involves contacting the emulsion with a specified volume of whole bacterial culture/culture extract, or with cells or extract recovered from the culture using known methods such as centrifugation, incubating the bacterial cell culture and the emulsion for a specified period of time e.g. up to 5 days with or without shaking or mixing and with or without aeration. The temperature used in the process should be 0–50° C., preferably 10–40° C. and more preferably 21–37° C. The emulsion separates, and usually may be observed visually to separate into a clearly defined top oil layer and a bottom water layer with solids dropping to the base of the reactor.

The bacterial culture used in this invention may be mixed bacterial culture produced by growth in a liquid medium containing hydrocarbons under non-sterile conditions. The inoculum used in this invention may also be a combination of pure cultures, or a combination of one or more pure cultures with a mixed culture.

In a preferred method of obtaining the culture, the bacterial culture used in the method of the present invention is a natural-occurring bacterial culture. Such a culture may be isolated from a hydrocarbon-contaminated soil or from hydrocarbon-containing sludge or from other environments, including soil or activated sludge, which may be rich in hydrocarbon-degrading bacteria, and inoculated in a basal medium, as described herein. The bacterial culture is selected by its ability to grow on petroleum hydrocarbons as the predominant source of carbon in the basal medium. Bacterial enrichment techniques for isolation of a bacterial culture capable of growing on hydrocarbons are well understood in the art. Typical techniques comprise adding a sample of soil, sludge or other material containing a large population of bacteria to an aqueous medium containing hydrocarbons as the only or predominant carbon source. Other chemical components including an inorganic nitrogen source, phosphorous and salts necessary to support bacterial growth are also added. Such a medium can be used to preferentially promote multiplication of hydrocarbon-degrading bacteria using standard aerobic microbial cultivation methods, including incubation in aerated microbial culture vessels. By transfer of a small amount of the resultant growth culture to further samples of the same medium and repeating the process one or more times, an efficient hydrocarbon degrading culture is selected. The culture can be maintained or stored using methods well known in the art.

In order to prepare a high density culture, the maintained culture may be inoculated into an aqueous medium consisting of the nutrients described herein, supplemented with petroleum hydrocarbons and incubated in an aerated reactor or fermenter or other culture vessel. The preferred inoculum volume is 0.1–20% by volume of total culture volume, preferably 1–5% by volume. The preferred concentration of petroleum hydrocarbons used in this inoculum development medium is 0.5–5%, and can be obtained from various sources including petroleum sludges, crude oils or refined oils such as diesel oil. A typical aeration rate of the inoculum reactor is 0.1–1.0 volumes of air per volume of medium per minute, with the culture incubated in the temperature range 20–37° C. for 1–7 days, preferably at 27–33° C., at a pH generally maintained in the range 6.5–8.0, preferably in the range 7–7.5. The resultant bacterial culture maybe used to inoculate the reactor containing the sludge to be degraded, at a rate of 0.1–20% of total sludge volume, preferably 1–10%. Where a much larger volume of inoculum is required, the resultant inoculum may be transferred as an inoculum to a larger culture vessel and the culture development process repeated on the larger scale.

Nutrients for the bacterial culture may also be added. A wide variety of nutrients for the bacterial culture may be used, as will be understood by persons skilled in the art. Such nutrients will include nitrogen, phosphorus and potassium compounds, and would normally also include a variety of other ingredients. In particular, the nutrients comprise bioavailable nitrogen and phosphorus compounds. In embodiments, the amount of nitrogen is in the range of 50–1000 ppm and preferably 400–700 ppm, and the amount of phosphate is in the range of 10–200 ppm and preferably 50–150 ppm. In addition to nitrogen and phosphorus compounds, the nutrient may also contain optimized concentrations of compounds other than nitrogen, phosphorus, carbon, oxygen and sodium, required to support bacterial growth and therefore it is normally necessary to add to the reactor one or more of magnesium, manganese, inorganic or organic sulphur, calcium, iron, copper, cobalt, zinc, boron and molybdenum. It will be appreciated that a guide for selection of the relative amounts of nitrogen, phosphorus and other required nutrients is to relate their concentrations to the amounts of these components present in bacterial cells.

By providing an appropriate balance of nutrients and by adjustment of nutrient concentration, it is possible to achieve high levels of growth of hydrocarbon degrading bacteria and thus accelerated rates of hydrocarbon degradation. For example, Greasham (1993) "Biotechnology, a multivolume comprehensive treatise" (Eds, Rehm, H. J., et al) Vol. 3, p.131, VCH, Weinheim) has reported the typical non-carbon elemental composition of major bacterial components to be nitrogen 12.5%; phosphorus, 2.5%; potassium, 2.5%; sodium, 0.8%; sulphur, 0.6%; calcium, 0.6%; magnesium, 0.3%; copper, 0.02%; manganese, 0.01% and iron, 0.01%. Use of appropriate concentrations and ratios of nutrients tends to avoid a situation where growth is limited by depletion of one essential nutrient while all other nutrients may be present in excess.

Techniques for the preparation of the bacteria will be understood by persons skilled in the art.

The culture used is characterized by its capacity to degrade one or more components of oil, or of chemical or nutrients added to oil, or to transform oil components and/or added chemical or nutrients to other products in a manner which breaks the emulsion. In addition, the microbial cells themselves or intracellular or extra-cellular products from the cells produced before or after contacting the culture with the oil-water emulsion may contribute to breaking the emulsion. Cultures having any combination of the above properties and which contribute to breaking the emulsion under the proper mechanical mixing and/or aeration conditions are within the scope of the invention. The invention also covers use of molecules produced by the cultures and fractions of cells which result in the breaking of the emulsion. In a preferred embodiment of the method of the invention, the culture consists of a mixed culture previously grown on a petroleum or other oil-containing substrate and having a starting call count in the emulsion treatment system of $5 \times 10^6 – 5 \times 10^9$ Cfu/ml and preferably greater than $5 \times 10^7$ Cfu/ml. Such a culture is added to the water-oil emulsion and mixed by stirring and/or aeration for a period of time to break the emulsion. During the reaction, one or more components of the emulsion are biotransformed or biodegraded, or otherwise transformed to disrupt the emulsion.

A light petroleum, or vegetable oil or other chemical or nutrient supplement or supplements may be added to the emulsion with the bacterial culture to promote breaking of the emulsion.

As noted above, the culture may consist of more than one pure culture or a combination of one or more pure cultures with a mixed culture. Preferably, the molecules or fractions are prepared as a crude aqueous extract or slurry of the culture.

In a further embodiment, molecules produced by the culture, or fractions of cells which break or contribute to de-emulsification, may be added alone or in combination with a culture, and/or oil or chemical supplement.

In a preferred embodiment, the cells, or molecules produced by the cells or fractions of cells are prepared in an aerated aqueous medium containing a hydrocarbon oil and/or vegetable oil substrate, under aseptic or non aseptic conditions. The bacteria are added at a concentration designed to break the emulsion within a given time period. It is understood that in general the higher the concentration of the culture, the faster the de-emulsification process.

In yet a further embodiment, the emulsion may be broken by using a combination of this biological method and other chemical or physical treatments, such as are described above. In a further embodiment, nutrients are added to the emulsion which promote selective growth of bacteria already present in the emulsion which have a capacity to break the emulsion.

The process may be operated to fully break the emulsion or partially break the emulsion. In the latter, remaining emulsion could be subjected to similar or other procedures to break the emulsion in subsequent steps.

The method of the present invention may be used in the treatment of water-oil emulsions, especially water-oil emulsions in the petroleum industry e.g. slop oil emulsion, to effect separation of an oil phase. The method is operated to minimize oil degradation, as oil is the prime commercial product of the method.

The present invention is illustrated by the following examples.

In the examples, unless noted otherwise, petroleum hydrocarbon degrading bacteria were selected by their ability to grow on petroleum hydrocarbons as the sole carbon source. An actively growing population of mixed culture was maintained ($10^9$ to $10^{10}$ CFU/ml) in cyclone fermentors by feeding either diesel, motor oil, refinery oil sludge or heavier hydrocarbon fraction of oily sludge. The general methods and nutrients used for growth of the culture are as described in our earlier patent application, PCT/CA98/00108.

In biological treatment tests, a concentrated inoculum was prepared by centrifuging the culture at 5000 rpm for 20 min and resuspending the cells in a small amount of water. The treatment flasks received bacterial culture to the final inoculum concentration of 5 to 50% ($5 \times 10^7$ to $5 \times 10^8$ CFU/ml). The flasks were incubated on a rotary shaker (200 rpm) at 30° C. for 48–72 hr. The flasks were let stand for 1 hr for the separation of oil from water and solids. The oil was analyzed for the contents of water, solids and total hydrocarbons (dichloromethane (DCM) extractables).

EXAMPLE I

Various emulsion samples were obtained from different sources. The samples were analyzed for water and solids content, and total hydrocarbons as DCM (dichloromethane) extractables. The characteristics (wt %) of different emulsion samples are shown in Table 1.

TABLE 1

| | Interface treater emulsion | Slop oil emulsions | | | |
| --- | --- | --- | --- | --- | --- |
| | | A | B | C | D |
| Components (wt %) | | | | | |
| DCM extractables | 19.2 | 72.5 | 53.9 | 61.0 | 79.5 |
| Hexane extractables | 15.2 | 56.3 | 46.4 | 47.1 | 65.4 |
| Solids | 4.5 | 9.8 | 3.2 | 5.0 | 2.0 |
| Water | 76.3 | 17.7 | 42.8 | 34.0 | 18.5 |

TABLE 1-continued

| | Interface treater emulsion | Slop oil emulsions | | | |
|---|---|---|---|---|---|
| | | A | B | C | D |
| Hydrocarbon fractions (% of total) | | | | | |
| Saturates | 19.8 | 21.9 | 21.7 | 12.9 | — |
| Aromatics | 50.0 | 47.8 | 54.7 | 37.2 | — |
| Resins | 9.4 | 8.0 | 9.6 | 5.3 | — |
| Asphaltenes | 20.8 | 22.3 | 14.0 | 22.8 | 17.7 |

Interface treater emulsion i.e. an emulsion from the interface of a treater, and slop oil emulsions have been described previously. Total hydrocarbons and water in these varied from 19 to 80% and from 17 to 76%, respectively. Analysis indicated a similar hydrocarbon composition in all of these samples.

EXAMPLE II

In a preliminary experiment, 47 g of the Interface emulsion sample were taken in 250 ml Erlenmeyer flasks. The flasks were supplemented with the nutrient medium and mixed culture. The nutrient medium consisted of (per liter): $KH_2PO_4$, 10.0 g; $Na_2HPO_4$, 15.0 g; $MgSO_4 \cdot 7\ H_2O$, 2 g; $Na_2CO_3$, 1.0 g; $CaCl_2 \cdot 2\ H_2O$, 0.5 g; $FeSO_4$, 0.05 g; urea, 20 g; yeast extract, 10 g, and trace metal solution, 30 ml. The trace metal solution contained (per liter): $ZnCl_2 \cdot 4\ H_2O$, 0.0144 g; $CoCl_2 \cdot 6\ H_2O$, 0.012 g; $Na_2MoO_4 \cdot 2\ H_2O$, 0.012 g; $CuSO_4 \cdot 5\ H_2O$, 1.9 g; $H_3BO_4$, 0.05 g; and HCl, 35 ml. The initial pH of the nutrient media was adjusted to 7.0. The flasks were incubated on a rotary shaker (200 rpm) at 30° C. for 48 hr. The flasks were let stand for 1 hr for the separation oil from water and solids. The bacterial cell count of the culture in the final reaction mixture was $5 \times 10^8$ CFU/ml.

The visual observations in these flasks are shown in Table 2.

TABLE 2

| Emulsion (g) | Water (ml) | Medium (ml) | Culture (ml) | Observations |
|---|---|---|---|---|
| 47 | 4 | 0 | 0 | Emulsion remains as such |
| 47 | 1 | 3 | 0 | Partial oil separation with cloudy water |
| 47 | 0 | 3 | 1 | Oils separation, clear water, solids at bottom |
| 47 | 0 | 3 | 1 | Oils separation, clear water, solids at bottom |
| 47 | 0 | 3 | 0.4 | Oils separation, clear water, solids at bottom |
| 47 | 0 | 3 | 0.2 | Oils separation, clear water, solids at bottom |
| 47 | 0 | 3 | 0.1 | Partial oil separation with clear water |

A nearly perfect separation was observed in the flasks containing only culture or nutrients and culture, oil layer on the top, a clear water phase in the middle and the solids/cells fell to the bottom. A cell concentration of 10–50% ($1-5\times10^8$ CFU/ml in the oil water emulsion) was effective in breaking the emulsion.

EXAMPLE III

In this example, slop oil emulsion from different sources were treated with the culture used in Example I. The flasks were incubated on a rotary shaker (200 rpm) at 30° C. for 72 hr. The flasks were let stand for 1 hr. for the separation of oil from water and solids. Recovered oil was analyzed for residual water, total hydrocarbons, and solids. The bacterial cell count of the culture in the final reaction mixture was about $1\times10^8$ CFU/ml. The initial water contents in Slop oil A, B and C were 17.7, 42.8 and 34.0% respectively.

Results are shown in Table 3.

TABLE 3

| Emulsion type and amount (g) | Water (ml) | Medium (ml) | Culture (ml) | Characteristics of recovered oil | | |
|---|---|---|---|---|---|---|
| | | | | Water (%) | Solids (%) | DCM extractables |
| Slop A, 45 g | 5 | 0 | 0 | 11 | 3 | 86 |
| | 5 | 0 | 1 | 1 | 2 | 97 |
| | 0 | 5 | 1 | 1 | 2 | 97 |
| Slop B, 50 g | 5 | 0 | 0 | 24 | 5 | 71 |
| | 5 | 0 | 1 | 5 | 3 | 92 |
| | 0 | 5 | 1 | 8 | 2 | 90 |
| Slop C, 45 g | 5 | 0 | 0 | 8 | 2 | 90 |
| | 5 | 0 | 1 | 0.2 | 1 | 98.8 |
| | 0 | 5 | 1 | 0.2 | 1 | 98.8 |
| | 5 | 0 | 2 | 0.1 | 1 | 98.9 |

The results indicate that the emulsion was successfully broken in all the slop oil samples tested, with 88–99% reduction of water content in recovered oil. Water content in recovered oil was <1% in slop oil A and C, and <5% in slop oil B. No significant effect of addition of media nutrients was observed.

EXAMPLE IV

Slop oil A was treated in 250 ml shaker flasks with the culture used in Example I, sewage sludge and proteins. The flasks were incubated on a rotary shaker (200 rpm) at 30° C. for 72 h. The flasks were let stand for 1 hr for the separation of oil form water and solids. Recovered oil was analyzed for water, total hydrocarbons, and solids. The bacterial cell count of the culture in the final reaction mixture was about $1\times10^8$ CFU/ml. The initial water content in Slop oil A was 17.7%.

Results are shown in Table 4.

TABLE 4

| Slop oil (g) | Water (ml) | Medium (ml) | Culture/Other additives | Characteristics of recovered oil | | |
|---|---|---|---|---|---|---|
| | | | | Water (%) | Solids (%) | DCM extractables (%) |
| 50 | 50 | 0 | None | 20 | 3 | 77 |
| 50 | 50 | 0 | 1 ml culture | 4 | 3 | 93 |
| 50 | 40 | 10 | 1 ml culture | 1 | 3 | 96 |
| 25 | 65 | 10 | 1 ml culture | 1 | 2 | 97 |
| 50 | 40 | 0 | 10 ml sewage sludge | 20 | 2 | 78 |
| 50 | 50 | 0 | 0.1 g extract | 10 | 1 | 89 |
| 50 | 50 | 0 | 0.01 g bovine albumen | 15 | 3 | 82 |

Maximum removal of water was achieved when the emulsion was inoculated with the mixed culture. Addition of sewage sludge, yeast extract or bovine albumen protein did not effect the emulsion breaking.

EXAMPLE V

In this example, Slop oil B was treated with mixed culture, sewage sludge or proteins in shaker flasks for 3 days at 30° C. on a rotary shaker (200 rpm). The flasks were let stand for 1 hr for the separation of oil from water and solids. Recovered oil was characterized. The bacterial cell count of the culture in the final reaction mixture was about $1 \times 10^8$ CFU/ml. Initial water content in slop oil B was 42.8%.

The results are shown in Table 5.

TABLE 5

| Slop oil (g) | Water (ml) | Medium (ml) | Culture/Other additives | Characteristics of recovered oil | | |
|---|---|---|---|---|---|---|
| | | | | Water (%) | Solids (%) | DCM extractables (%) |
| 50 | 50 | 0 | None | 35 | 2 | 63 |
| 80 | 10 | 10 | 1 ml culture | 5 | 3 | 92 |
| 90 | 0 | 10 | 1 ml culture | 8 | 3 | 89 |
| 50 | 50 | 0 | 0.1 g yeast extract | 29 | 2 | 69 |
| 50 | 50 | 0 | 0.01 g bovine albumen | 23 | 2 | 75 |
| 50 | 40 | 0 | 10 ml sewage sludge | 35 | 2 | 63 |

Maximum removal of water from slop oil B was achieved when the emulsion was inoculated with the mixed culture in the presence of nutrient medium. Addition of sewage sludge, yeast extract or bovine albumen protein did not significantly affect the emulsion breaking.

EXAMPLE VI

In this example, the effect of water content on recovery of oil from Slop oil A and B was investigated. Slop oils was treated with the same mixed culture for 3 days at 30° C. on a rotary shaker (200 rpm). The flasks were let stand for 1 hr for the separation of oil from water and solids. Each flask received 1 ml of mixed culture. The bacterial cell count of the culture in the final reaction mixture was about $1 \times 10^8$ CFU/ml. Initial water contents in slop oil A and B were 17.7& and 42.8%, respectively. The recovered oil was characterized.

The results are shown in Table 6.

TABLE 6

| | Water | Slop oil A | | | Slop oil B | | |
|---|---|---|---|---|---|---|---|
| Slop oil (g) | addition (ml) | Water (%) | Solids (%) | DCM extractables | Water (%) | Solids (%) | DCM extractables |
| 100 | 0 | 1 | 2 | 97 | 10 | 3 | 87 |
| 90 | 10 | 2 | 2 | 96 | 5 | 3 | 92 |
| 80 | 20 | 1 | 2 | 97 | 27 | 2 | 71 |
| 70 | 30 | 16 | 2 | 82 | 26 | 2 | 72 |
| 60 | 40 | 18 | 2 | 82 | 27 | 2 | 71 |
| 50 | 50 | — | — | — | 27 | 2 | 71 |

Effective emulsion breaking and maximum reduction of water in oil emulsions was observed when water addition was less that 20% in slop oil A and less than 10% in slop oil B.

EXAMPLE VII

In this example, effect of biological treatment on the breaking of emulsion and biodegradation of total hydrocarbons and hydrocarbon fractions of the slop oil was investigated. Slop oil C. was treated with the mixed culture for 2 days at 30° C. on a rotary shaker (200 rpm). The whole flask was extracted with dichloromethane and different hydrocarbon fractions were analyzed.

The results are shown in Table 7.

TABLE 7

| Hydrocarbons | % Degradation |
|---|---|
| DCM extractables | 8.2 |
| Hexane extractables | 14.8 |
| Saturates | 11.6 |
| Aromatics | 4.8 |
| Resins | 13.2 |
| Asphaltenes | 0 |

Results indicate degradation of all the hydrocarbon fractions except asphaltene.

EXAMPLE VIII

In this example, effect of shaking on breaking of emulsion and oil recovery was investigated in 250 ml shake flasks. To 50 g Slop oil B, 5 ml nutrient medium and 5 ml mixed culture inoculum ($1 \times 10^8$ CFU/ml) was added. The flasks were vortexed for 1 min to distribute the inoculum in emulsion. One set of flasks was incubated at 30° C. under stationary condition and another set of flasks were incubated at 30° C. on a rotary shaker at 200 rpm. The bacterial cell count of the culture in the final reaction mixture was about $1 \times 10^8$ CFU/ml. Initial water content in slop oil B was 42.8%.

Recovered oil was characterized and the results are shown in Table 8.

TABLE 8

| Culture condition | Time (d) | Characteristics of recovered oil | | |
|---|---|---|---|---|
| | | Water (%) | Solids (%) | DCM extractables |
| Stationary | 3 | 20 | 3 | 77 |
| | 7 | 5 | 3 | 92 |
| | 14 | 4 | 3 | 93 |
| Shaken | 3 | 8 | 2 | 90 |
| | 7 | 1 | 2 | 97 |

Biological treatment under both stationary and shaken culture conditions resulted in emulsion breaking. However, maximum removal of water from the recovered oil was observed in shaken culture.

EXAMPLE IX

In this example, effect of different additives on breaking of emulsion and oil recovery was investigated. Slop oil B was treated with the mixed culture in the presence of different additives viz peanut oil, diesel and gasoline, for 3 days at 30° C. on a rotary shaker (200 rpm). The flasks were let stand for 1 hr for the separation of oil from water and solids. The bacterial cell count of the culture in the final reaction mixture was about $1 \times 10^8$ CFU/ml in each flask. Initial water content in slop oil B was 42.8%.

Recovered oil was characterized and the results are shown in Table 9.

TABLE 9

| Additives | Concentration (%) | Characteristics of recovered oil | | |
|---|---|---|---|---|
| | | Water (%) | Solids (%) | DCM extractables |
| None | — | 10 | 3 | 87 |
| Peanut Oil | 0.1 | 1 | 2 | 97 |
| Diesel | 0.1 | 3 | 1 | 96 |
| | 0.5 | 1.5 | 3 | 95.5 |
| | 1.0 | 1 | 3 | 96 |
| | 2.0 | 0.05 | 3 | 96.9 |
| | 4.0 | 0.1 | 2 | 97.9 |

Results indicate that addition of vegetable oil or petroleum products was beneficial in emulsion breaking and removal of water. Increase in diesel concentration increased the removal of water from the emulsion.

EXAMPLE X

In this example, biological treatment of slop oil emulsion was scaled up in a stirred reactor. About 1.5L of slop oil D was mixed with 150 ml of the culture (~$1 \times 10^8$ CFU/ml), 15 ml diesel and 15 ml nutrient medium in a 2L beaker. Contents were incubated at room temperature with continuous stirring using a laboratory stirrer equipped with a ring guard 3 blade propeller (dia. 4 cm) at about 250 rpm. At different time intervals, 50 ml samples were taken out in a 100 ml beaker and let stand for 2 hr for the separation of oil from water and solids. The bacterial cell count of the culture in the final reaction mixture was about $1 \times 10^8$ CFU/ml.

The results are shown in Table 10.

TABLE 10

| Incubation Time (h) | Characteristics of recovered oil | | |
|---|---|---|---|
| | Water (%) | Solids (%) | DCM extractables |
| 0 | 18.5 | 2.0 | 79.5 |
| 24 | 8.0 | — | — |
| 48 | 7.0 | — | — |
| 72 | 0.5 | 1.0 | 98.5 |
| 96 | 0.5 | 0.7 | 98.8 |

In the stirred reactor, water and solid contents reduced within 3 days to 0.5% and 1.0%, respectively.

What is claimed is:

1. A process for breaking an oil-water emulsion containing solids, comprising:
    a) contacting the oil-water emulsion with a bacterial culture produced by growth in a liquid medium containing hydrocarbons under non-sterile conditions, said oil-water emulsion and bacterial culture being contacted under conditions that minimise degradation of said oil;
    b) permitting the oil-water emulsion to form an oil layer and a water layer, the solids present in the emulsion being permitted to settle to the bottom of the water layer; and
    c) separating each of the oil layer and the water layer so formed.

2. The process of claim 1 in which the culture consists of a mixed culture previously grown on a petroleum or other oil-containing substrate.

3. The process of claim 1 in which the culture has a starting cell count in the emulsion treatment system of $5 \times 10^6 - 5 \times 10^9$ Cfu/ml.

4. The process of claim 3 in which the culture has a starting call count in the emulsion treatment system of greater than $5 \times 10^7$ Cfu/ml.

5. The process of claim 1 in which a light petroleum, or vegetable oil or other chemical or nutrient supplement or supplements is added to the emulsion, with the bacterial culture, to promote breaking of the emulsion.

6. The process of claim 1 in which the culture consists of more than one pure culture or a combination of one or more pure cultures with a mixed culture.

7. The process of claim 1 in which molecules produced by the culture, or fractions of cells which break or contribute to de-emulsification, are added alone, or in combination with a culture, and/or oil or chemical supplement.

8. The process of claim 1 in which the biological process is used concurrently or sequentially in any order with another physical or chemical treatment to break the emulsion.

9. The process of claim 1 in which the culture is generated by adding nutrients to the emulsion, to promote selective growth of bacteria in the emulsion.

10. The process of claim 9 in which a combination of added culture and bacteria already present in the emulsion cause the emulsion to break.

11. The process of claim 1 in which partial breaking of the emulsion occurs.

12. The process of claim 1 in which molecules of fractions of cells of the culture are obtained as a crude aqueous extract or slurry of the culture.

13. The process of claim 1 in which the emulsion is a slop oil emulsion.

* * * * *